United States Patent
Jha et al.

(10) Patent No.: US 11,673,670 B2
(45) Date of Patent: Jun. 13, 2023

(54) AIRCRAFT PASSENGER READING LIGHT HAVING A VISIBLE AND INFRARED LIGHT SOURCE

(71) Applicant: Goodrich Lighting Systems GmbH & Co. KG, Lippstadt (DE)

(72) Inventors: Anil Kumar Jha, Lippstadt (DE); Jens Leuschner, Moehnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/485,908

(22) Filed: Sep. 27, 2021

(65) Prior Publication Data
US 2022/0097853 A1  Mar. 31, 2022

(30) Foreign Application Priority Data
Sep. 28, 2020 (EP) ..................... 20198732

(51) Int. Cl.
| B64D 11/00 | (2006.01) |
| B60Q 3/44 | (2017.01) |
| B60Q 3/60 | (2017.01) |
| B65D 47/08 | (2006.01) |
| H04N 5/33 | (2023.01) |

(52) U.S. Cl.
CPC ............... *B64D 11/00* (2013.01); *B60Q 3/44* (2017.02); *B60Q 3/60* (2017.02); *B65D 47/08* (2013.01); *H04N 5/33* (2013.01); *B64D 2011/0053* (2013.01)

(58) Field of Classification Search
CPC .... B60Q 3/44; B60Q 3/76; B64D 2011/0053; B64D 11/00
See application file for complete search history.

(56) References Cited

U.S. PATENT DOCUMENTS

| 8,687,977 | B2 | 4/2014 | Niehoff |
| 10,449,895 | B2 | 10/2019 | Pozzi et al. |
| 10,464,673 | B2* | 11/2019 | Hessling-Von Heimendahl ......... B60Q 3/68 |
| 10,800,529 | B2* | 10/2020 | Klose ..................... B64D 11/00 |
| 2019/0092472 | A1 | 3/2019 | Gehle et al. |
| 2022/0024380 | A1* | 1/2022 | Chen ..................... H05B 47/13 |

FOREIGN PATENT DOCUMENTS

GB    2536712 A    3/2015

* cited by examiner

*Primary Examiner* — Robert J May
(74) *Attorney, Agent, or Firm* — Cantor Colburn LLP

(57) ABSTRACT

An aircraft passenger reading light comprises at least one reading light source, which is arranged for emitting visible light in a reading light emission direction; and at least one infrared light source, which is arranged for emitting infrared light in an infrared light emission direction. The infrared light emission direction is inclined with respect to the reading light emission direction.

19 Claims, 9 Drawing Sheets

AIRCRAFT PASSENGER READING LIGHT HAVING A VISIBLE AND INFRARED LIGHT SOURCE

CROSS REFERENCE TO RELATED APPLICATIONS

This application claims priority to European Patent Application No. 20198732.8 filed Sep. 28, 2020, the entire contents of which is incorporated herein by reference.

TECHNICAL FIELD

The present invention is in the field of interior aircraft lighting. The present invention is in particular in the field of aircraft passenger reading lights.

BACKGROUND

In order to enhance security, passenger aircraft, such as commercial air planes, are often equipped with camera-based video surveillance systems for monitoring processes on board the aircraft. In order to allow such surveillance systems to operate in a dark environment, for example when the cabin lights of the aircraft are dimmed or switched off, the surveillance systems may include cameras which are sensitive to infrared (IR) light. The effectiveness of current IR-light-based surveillance systems is not always satisfactory.

It would therefore be beneficial to provide lighting components for an aircraft passenger cabin that enhance the effectiveness of surveillance systems employing cameras which are sensitive to infrared light.

SUMMARY

Exemplary embodiments of the invention include an aircraft passenger reading light, comprising at least one reading light source, which is arranged for emitting visible light in a reading light emission direction for illuminating a passenger reading space with visible light, and at least one infrared light source, which is arranged for emitting infrared light in an infrared light emission direction for illuminating a passenger sifting space with infrared light. The infrared light emission direction is inclined with respect to the reading light emission direction so that the visible light and the infrared light are not emitted parallel to each other.

An aircraft passenger reading light according to an exemplary embodiment of the invention allows for emitting visible light into a region in which it allows or facilitates reading for a passenger sitting on a passenger seat arranged below the aircraft passenger reading light, with this region herein also being referred to as passenger reading space. In addition, the aircraft passenger reading light allows for emitting infrared light into a region which is occupied by the passenger's body in the seated position, with this region herein also being referred to as passenger sitting space The infrared light may be directed onto the passenger sitting within the passenger seat, in particular onto an upper portion of the passenger's body, more particularly onto the face of the passenger. The emission of infrared light may thus allow for a targeted provision of infrared illumination and an effective taking of pictures of the passenger with at least one camera which is sensitive to infrared light. The provision of visible light for the illumination of the passenger's personal reading space and the provision of infrared light for an effective surveillance of the passenger via an on-board surveillance system may be combined in a single light unit, allowing for an overall low number of lighting components and a high integration density/low space requirements. Also, the comparably short distance between the at least one infrared light source and the passenger sitting space may allow for an effective IR illumination with a low amount of infrared light.

Exemplary embodiments of the invention also include a combination of a passenger seat, which is configured to be installed within an aircraft passenger cabin and configured for accommodating a passenger, and an aircraft passenger reading light according to an exemplary embodiment of the invention, wherein the aircraft passenger reading light is arranged in such a spatial relationship with respect to the passenger seat that the aircraft passenger reading light, when operated, emits visible light into a region in which it allows or facilitates a passenger sitting on a passenger seat to read, i.e. into a passenger reading space, and that the aircraft passenger reading light further emits infrared light onto a part of the body, in particular an upper part of the body, of the passenger sitting on the passenger seat.

The aircraft passenger reading light may for example be configured for emitting visible light onto a table, in particular a foldable table, which is arranged in front of and/or above the lap of the passenger sitting on the passenger seat.

Exemplary embodiments of the invention further include an aircraft passenger cabin, comprising an aircraft passenger seat and an aircraft passenger reading light according to an exemplary embodiment of the invention, wherein the reading light emission direction is directed towards a front portion of the passenger seat and wherein the infrared light emission direction is directed towards a back rest and/or towards a head rest of the passenger seat. Exemplary embodiments of the invention also include an aircraft with such an aircraft passenger cabin. The aircraft may be an air plane, in particular a commercial passenger air plane, or a helicopter.

The above mentioned requirement that the reading light emission direction is directed towards a front portion of the passenger seat does not necessarily require that all visible light emitted by the reading light source is emitted into a region located in a front portion of the passenger seat. Instead, it is sufficient that a considerable portion of the light emitted by the reading light source is emitted into said region.

Similarly, the above mentioned requirement that the infrared light emission direction is directed towards a back rest and/or towards a head rest of the passenger seat does not necessarily require that all infrared light emitted by the infrared light source is emitted into said region. Instead, it is sufficient that a considerable portion of the light emitted by the infrared light source is emitted towards a back rest and/or towards a head rest of the passenger seat in order to illuminate an upper portion, in particular the chest and/or the head, of a passenger sitting on the passenger seat.

Further, in the context of the present invention, the "front portion of the passenger seat" is not restricted to the seat pan of the passenger seat. Instead, the front portion of the passenger seat also includes a space above and in front of the seat pan, in particular a space between the seat pan and another passenger seat located in front of the seat and/or a space extending above the seat pan and in front of the back rest of the passenger seat in which a passenger sitting on the passenger seat usually positions texts for reading.

Exemplary embodiments of the invention further include an aircraft cabin surveillance system, comprising at least one aircraft passenger reading light according to an exemplary embodiment of the invention and at least one surveillance camera which is sensitive to infrared light.

Exemplary embodiments of the invention also include an aircraft passenger cabin which is equipped with such an aircraft cabin surveillance system. Exemplary embodiments of the invention also include an aircraft with such an aircraft passenger cabin surveillance system. The aircraft may be an air plane, in particular a commercial passenger air plane, or a helicopter.

Exemplary embodiments of the invention further include a method of monitoring at least one passenger in an aircraft passenger cabin which is equipped with at least one aircraft passenger reading light according to an exemplary embodiment of the invention, wherein the method includes: illuminating at least a portion of the passenger's body with infrared light emitted by the at least one infrared light source, and taking pictures of the at least one passenger with at least one surveillance camera, which is sensitive to infrared light.

Exemplary embodiments of the invention allow for monitoring passengers within a dark aircraft passenger cabin, employing at least one camera which is sensitive to infrared light. Since, according to exemplary embodiments of the invention, the at least one infrared light source is integrated with an aircraft passenger reading light, as it is usually provided in passenger cabins in order to allow the passengers to read when the main light within the passenger cabin is switched off, there is no need for providing a further lighting or illumination device in addition to the at least one aircraft passenger reading light. By employing aircraft passenger reading lights according to exemplary embodiments of the invention, the passengers sitting within a passenger cabin of an aircraft may be illuminated highly uniformly with infrared light. As a result, pictures of similarly good quality may be captured of most or even all passengers.

In an embodiment, the aircraft passenger reading light comprises a housing, and the infrared light source is arranged within said housing so that no infrared light is emitted directly towards the at least one surveillance camera. In consequence, the quality of the pictures provided by the at least one surveillance camera is enhanced as the infrared light, emitted by the at least one infrared light source, does not glare the at least one surveillance camera.

In an embodiment, the infrared light source is configured for emitting infrared light having a wavelength of 800 to 850 nm. In an embodiment, the reading light source is configured for emitting visible light having a wavelength of 380 to 780 nm.

In an embodiment, the infrared light source and/or the reading light source comprises at least one LED or is at least one LED, respectively. LEDs provide reliable and efficient light sources at reasonable costs.

In an embodiment, the reading light source is configured for emitting visible light into a reading light region, in particular as a reading light beam extending around a reading light axis, wherein the reading light axis coincides with the reading light emission direction.

In an embodiment, the infrared light source is configured for emitting the infrared light into an infrared light region, in particular as an infrared light beam extending around an infrared light axis, wherein the infrared light axis coincides with the infrared light emission direction.

In an embodiment, the infrared light emission direction (infrared light axis) is inclined with respect to the reading light emission direction (reading light axis) at an angle between 5° and 30°, in particular at an angle between 10° and 20°, more particularly at an angle of about 15°. An angle in the range of 5° to 30°, in particular an angle in the range of 10° and 20°, more particularly an angle of about 15° between the infrared light emission direction and the reading light emission direction may be highly effective for illuminating a passenger sitting under the aircraft passenger reading light with infrared light, while simultaneously emitting visible light into a reading region in which it allows or facilitates the passenger to read.

In an embodiment, the aircraft passenger reading light comprises at least one common optical element, which is configured for directing the visible light emitted by the a least one reading light source into the reading light region and for directing the infrared light emitted by the at least one infrared light source into the infrared light region, respectively. The at least one common optical element in particular may be configured for forming a reading light beam and an infrared light beam.

Such a configuration allows for illuminating a passenger with infrared light, while simultaneously emitting visible light into a region in which it it allows or facilitates the passenger to read. Using a common optical element for both, directing the visible light into the reading region and directing the infrared light onto the passenger, allows for reducing the size and the costs of the aircraft passenger reading light.

In an embodiment, the at least one common optical element includes at least one lens, at least one reflector, at least one shutter, or a combination or subset thereof.

In an embodiment, the at least one infrared light source is arranged behind an optical element, such as a lens, so that the optical element is arranged between the infrared light source and the passenger(s). When the at least one infrared light source is arranged behind an optical element, the risk that infrared light emitted by the at least one infrared light source is visible to passengers having sensitive eyes, in particular eyes which are very sensitive to infrared light, is considerably reduced.

In an embodiment, the common optical element includes a lens which is arranged in a distance of 20 mm (0.7874 inch) to 40 mm (1.5748 inch), in particular at a distance of 25 mm (0.9843) inch to 35 mm (1.3780 inch), more particularly at a distance of approximately 30 mm (1.1811 inch), from the light sources. Such a configuration may provide for a compact aircraft passenger reading light, emitting appropriately shaped and oriented beams of visible light and infrared light, respectively.

In an embodiment, the reading light beam and/or the infrared light beam have opening angles of between 20° and 30°, in particular close to 25°, respectively. Light beams having an opening angle in the range of 20° to 30° have been found as beneficial for providing an appropriately illuminated reading region, without glaring adjacent passengers. Opening angles in the range of 20° to 30° further have been found as effective for illuminating an upper part of a passenger's body, in particular an upper part of a passenger's body including the passenger's head.

In an embodiment, the at least one reading light source and the at least one infrared light source are mounted to a common support member, in particular to a common printed circuit board. A configuration comprising a common support member may provide for a compact aircraft passenger reading light which may be produced easily and at relatively low costs.

In an embodiment, the at least one reading light source and the at least one infrared light source are spaced apart from each other at a distance in the range of 3 mm (0.1181 inch) to 8 mm (0.3150 inch), in particular at a distance of 5 mm (0.1969 inch).

In an embodiment the aircraft passenger reading light comprises a plurality of reading light sources and a plurality of infrared light sources, respectively, wherein each of the plurality of reading light sources is associated with a respective infrared light source.

Such a configuration may allow for emitting visible reading light and infrared surveillance light to a plurality of passenger seats, employing only a single aircraft passenger reading light. This may reduce the amount of space needed for the installation of the aircraft passenger reading lights within an aircraft passenger cabin comprising a plurality of passenger seats. It may further allow for reducing the costs for the aircraft passenger reading lights as it allows using components of the aircraft passenger reading lights, such as a printed circuit board and/or an optical element, not only for providing visible reading light, but additionally for illuminating a plurality of passenger seats with infrared light.

In an embodiment, the aircraft passenger reading light comprises a plurality of reading light sources and a plurality of infrared light sources, respectively. The plurality of reading light sources are arranged in multiple groups of reading light sources, and each of the multiple groups of reading light sources is associated with an associated infrared light source, respectively.

Providing groups of reading light sources, each group comprising a plurality of reading light sources, may allow for adjusting the reading light emission direction by selectively activating a single reading light source of the respective group of light sources associated with one of the passenger seats. This allows for accommodating the reading light emission direction to different positions of the passenger seat with respect to the associated reading light sources. It in particular allows for adjusting the reading light emission direction to a varying position of the passenger seat in the longitudinal direction of the passenger cabin.

In an embodiment, a plurality of light sources are arranged in a matrix configuration including a plurality of rows and columns. At least one infrared light source and a plurality of reading light sources are arranged in each of the columns, respectively. Such a configuration may allow for simultaneously illuminating a plurality of passenger seats with a single aircraft passenger reading light and individually adjusting the reading light emission direction for each of the passenger seats.

In an embodiment, the distance between adjacent rows is in the range of 2 mm (0.0787 inch) to 5 mm (0.1969 inch). In an embodiment, the distance between adjacent columns is in the range of 5 mm (0.1969 inch) to 15 mm (0.5906).

Such distances between adjacent rows/columns of lights sources have been found as beneficial for illuminating adjacent passenger seats in typical aircraft passenger cabin configurations.

In an embodiment, the aircraft passenger reading light further comprises a photodetector and a controller. In such an embodiment, the photodetector is configured for detecting visible light, and the controller is configured for controlling the operation of the at least one infrared light source as a function of the visible light detected by the photodetector.

The combination of a controller with at least one photodetector may allow for controlling the operation of the at least one infrared light source as a function of the amount of visible light present in the aircraft passenger cabin. It in particular allows deactivating the at least one infrared light source if the amount of visible light within the aircraft passenger cabin is sufficient for monitoring the passengers within the cabin without activating the at least one infrared light source.

In an embodiment, the controller is configured for activating the at least one infrared light source when the amount of visible light detected by the photodetector is below a predetermined activation threshold and/or the controller is configured for deactivating the at least one infrared light source when the amount of visible light detected by the photodetector exceeds a predetermined deactivation threshold.

Such a configuration may avoid an unnecessary operation of the at least one infrared light source when the amount of light detected within the aircraft passenger cabin is sufficient for monitoring the passengers within the cabin without providing additional light from the at least one infrared light source.

The activation threshold and the deactivation threshold may be identical. Alternatively, the activation threshold and the deactivation threshold may be different constituting a hysteresis, in order to avoid that the at least one infrared light source is alternatingly switched on and off, when the detected amount of visible light is close to the predetermined threshold.

In another embodiment, the controller is configured for gradually adjusting the intensity of infrared light emitted by the at least one infrared light source as a function of the intensity of visible light detected by the at least one photodetector. The controller in particular may be configured for increasing the intensity of infrared light emitted by the at least one infrared light sources when the intensity of visible light detected by the at least one photodetector decreases and/or the controller may be configured for decreasing the intensity of infrared light emitted by the at least one infrared light sources when the intensity of visible light detected by the at least one photodetector increases.

The controller may be configured for increasing and/or decreasing the intensity of infrared light emitted by the at least one infrared light source continuously or step by step. These steps may include at least one step in which the at least one infrared light source it not completely switched on (100%) or off (0%), but is operated for emitting less than 100% of its maximum intensity. This, for example, may include selectively operating the at least one infrared light source at intensities of 10%, 25%, 33%, 50%, 66%, 75%, 90% of its maximum intensity or any selection thereof. The skilled person understands that selectively operating the at least one infrared light source at other percentages of its maximum intensity is possible as well.

Such a combination of a controller and at least one photodetector may allow for optimizing the illumination of the passenger for monitoring the passengers with an infrared sensitive camera, without operating the at least one infrared light source with a higher intensity than necessary. It in particular prevents the passenger from being overexposed to infrared light. Overexposure may result in a reduced quality of the pictures taken by the camera.

BRIEF DESCRIPTION OF THE DRAWINGS

Further exemplary embodiments of the invention will be described with respect to the accompanying drawings, wherein.

DETAILED DESCRIPTION

Figure 1:
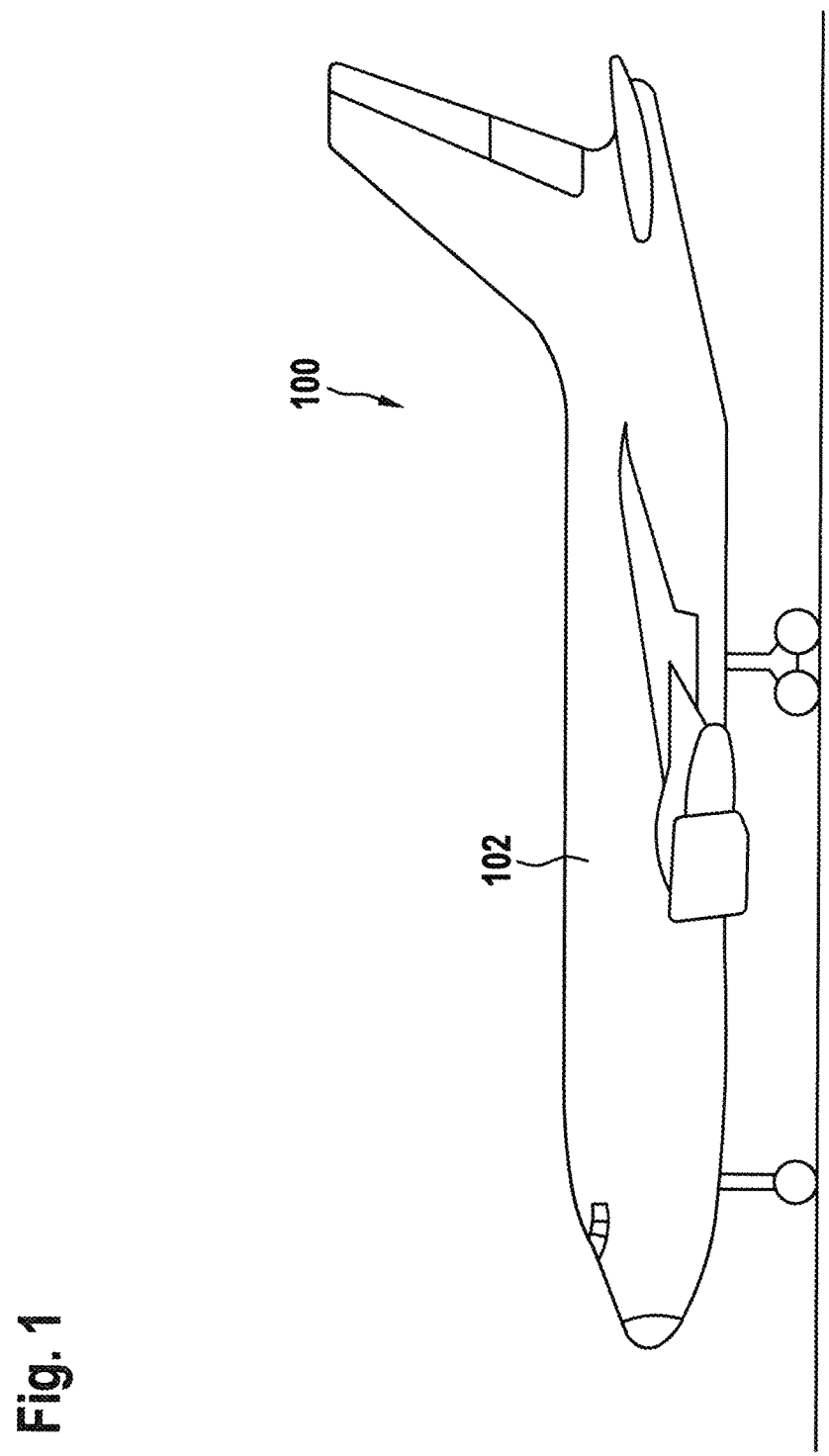
FIG. 1 shows a schematic side view of an aircraft in accordance with an exemplary embodiment of the invention having a passenger cabin.

FIG. 1 is a schematic side view of an aircraft 100 with a passenger cabin 102.

Figure 2A:
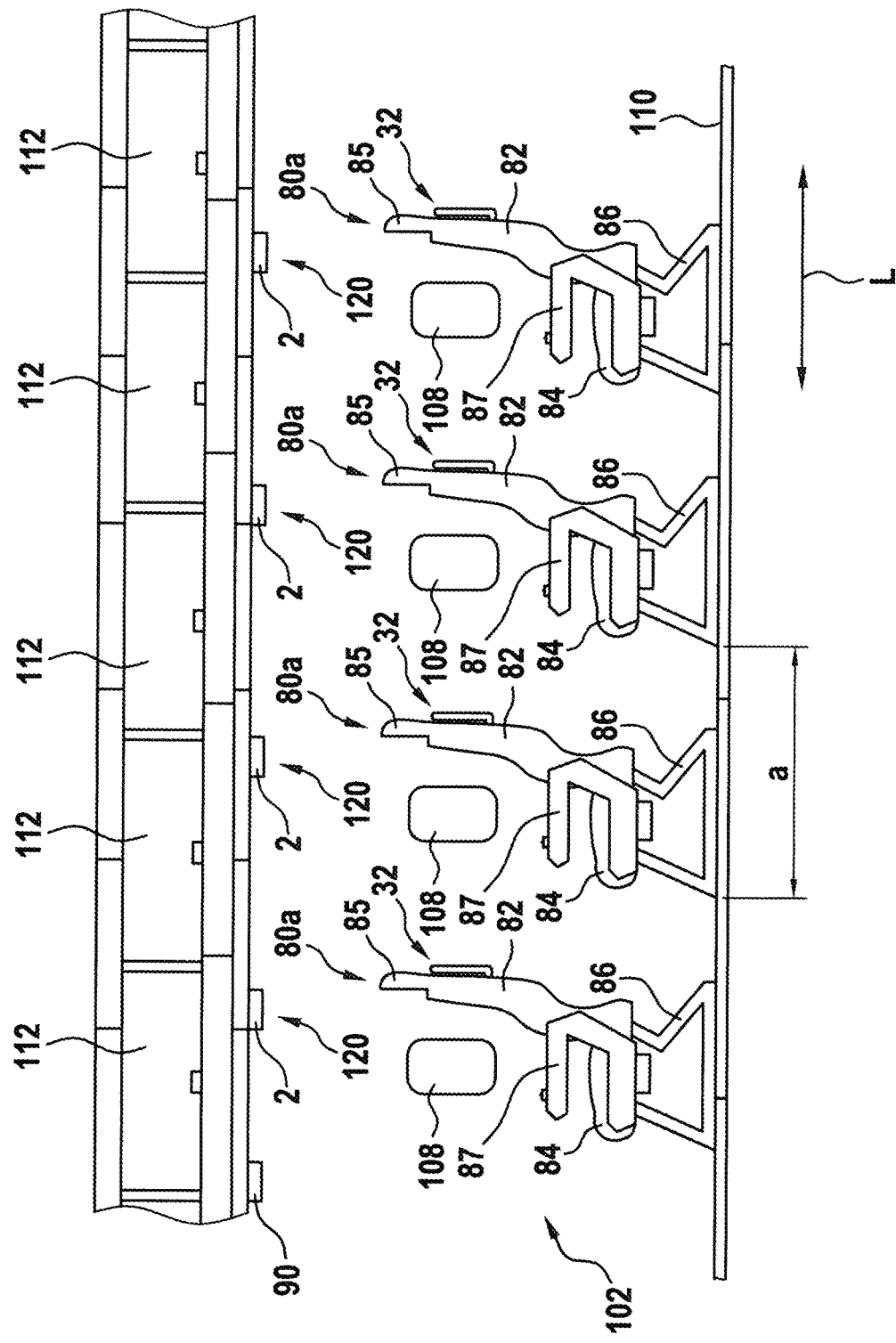
FIG. 2A shows a longitudinal cross-sectional view of a portion of the passenger cabin of the aircraft shown in FIG. 1.
Figure 2B:
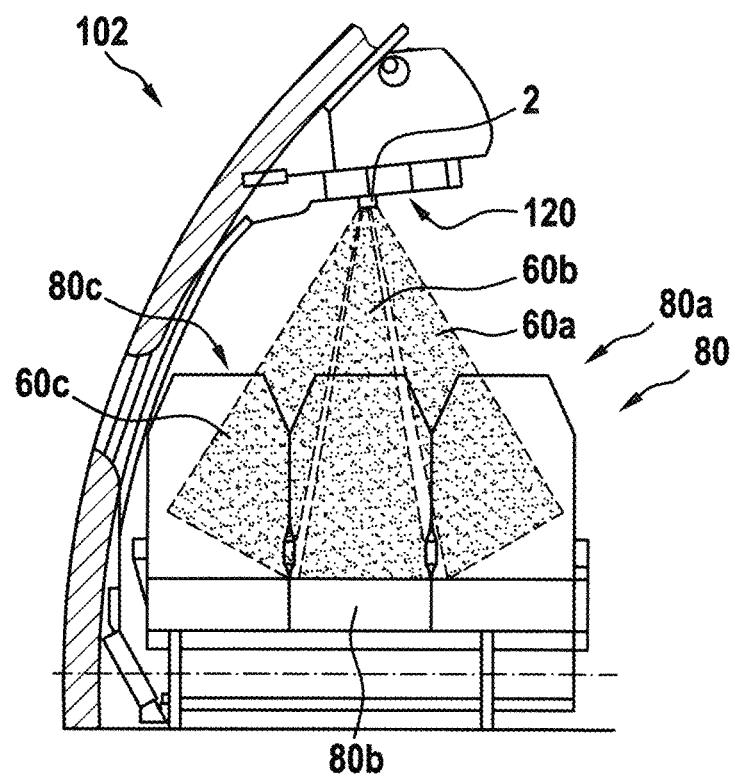
FIG. 2B shows a lateral cross-sectional view of a portion of the passenger cabin of the aircraft shown in FIG. 1.

FIG. 2A shows a longitudinal cross-sectional view of a portion of the passenger cabin 102 of the aircraft 100. FIG. 2B shows a partial cross-sectional view of the passenger cabin 102 in a plane which is oriented orthogonally to the longitudinal direction L.

Four seats 80a, also referred to as passenger seats 80a, are depicted in FIG. 2A. The passenger seats 80a are mounted to a floor 110 of the passenger cabin 102. Each of the depicted passenger seats 80a belongs to a different seating row 80.

For each of the seat rows 80, a window 108 is provided, which allows the passengers to view the outside of the aircraft 100. Further, a plurality of overhead baggage compartments 112 are shown, which provide storage space for baggage.

Each seating row 80 includes three passenger seats 80a, 80b, 80c arranged next to each other, as shown in FIG. 2B. The second and third passenger seats (middle seat and window seat) 80b, 80c of each seating row 80 are not visible in FIG. 2A, as they are arranged behind and therefore hidden by the depicted first passenger seats (aisle seats) 80a.

Each of the passenger seats 80a has a seat pan 84, a seat base 86, an arm rest 87, and a seat back (backrest) 82, including a head rest 85, and a foldable table 32, mounted to a rear side of the backrest 82. The arm rest 87 may be pivotable around a horizontal axis. The seat base 86 supports the backrest 82 and the seat pan 84.

A passenger service unit (PSU) 120 is arranged above each of the seat rows 80, respectively. Each PSU 120 may comprise gaspers, loudspeakers, emergency oxygen masks and one or more service call buttons, which are not shown in FIGS. 2A and 2B.

Each PSU 120 further comprises at least one aircraft passenger reading light 2, which is configured for providing individual reading lighting for each passenger sitting in one of the passenger seats 80a-80c, respectively. This allows the passengers to read even if the general cabin light is dimmed or switched-off.

In order to allow monitoring the passengers, at least one surveillance camera 90 is installed within the passenger cabin 102. The at least one surveillance camera 90 in particular is sensitive to infrared light in order to allow monitoring the passengers even in a dark passenger cabin 102. The at least one surveillance camera 90 additionally may be sensitive to visible light, or the at least one surveillance camera 90 may be sensitive to infrared light only.

A surveillance camera 90 may be arranged over each passenger seat 80a-80c or over each row 80 of passenger seats 80a-80c, respectively. Alternatively or additionally, larger areas of the passenger cabin 102, including a plurality of seat rows 80, may be covered by a single surveillance camera 90.

The at least one surveillance camera 90 may be stationary. Alternatively, the at least one surveillance camera 90 may be movable, in particular pivotable, in order to allow scanning a larger area of the passenger cabin 102 with a reduced number of surveillance cameras 90, in particular scanning the whole passenger cabin 102 with only a single surveillance camera 90.

Figure 3A:
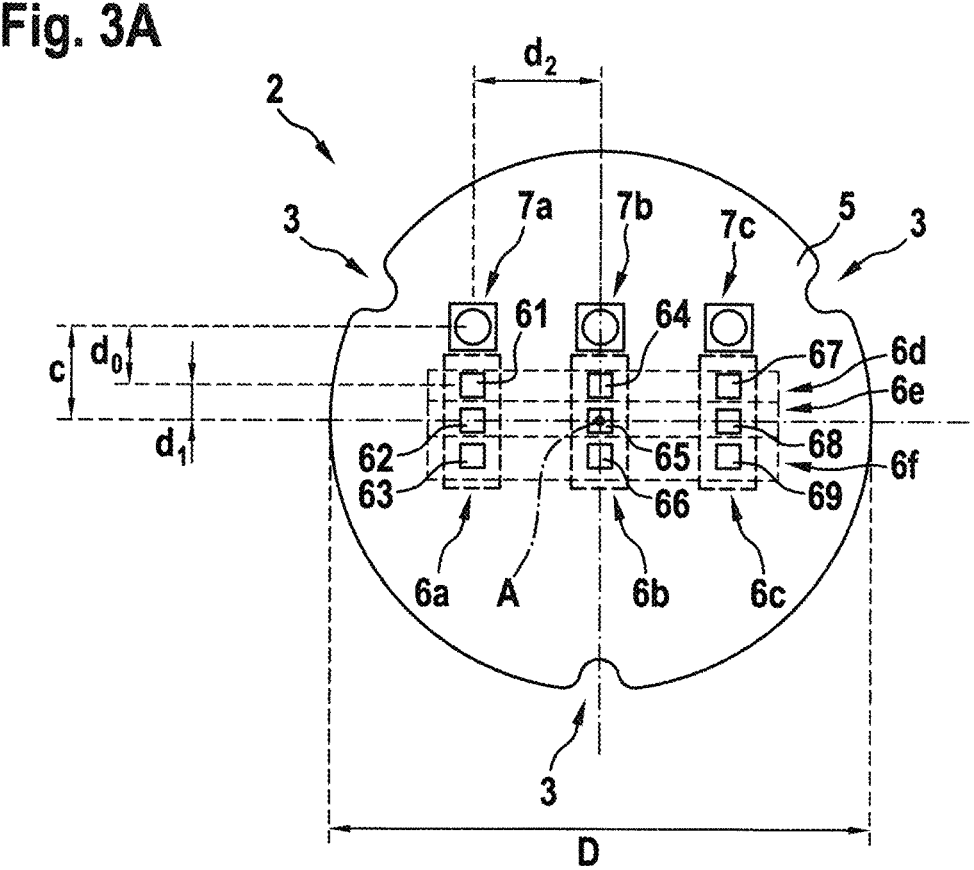
FIG. 3A shows a cross-sectional view of an aircraft passenger reading light according to an exemplary embodiment of the invention.
Figure 4:
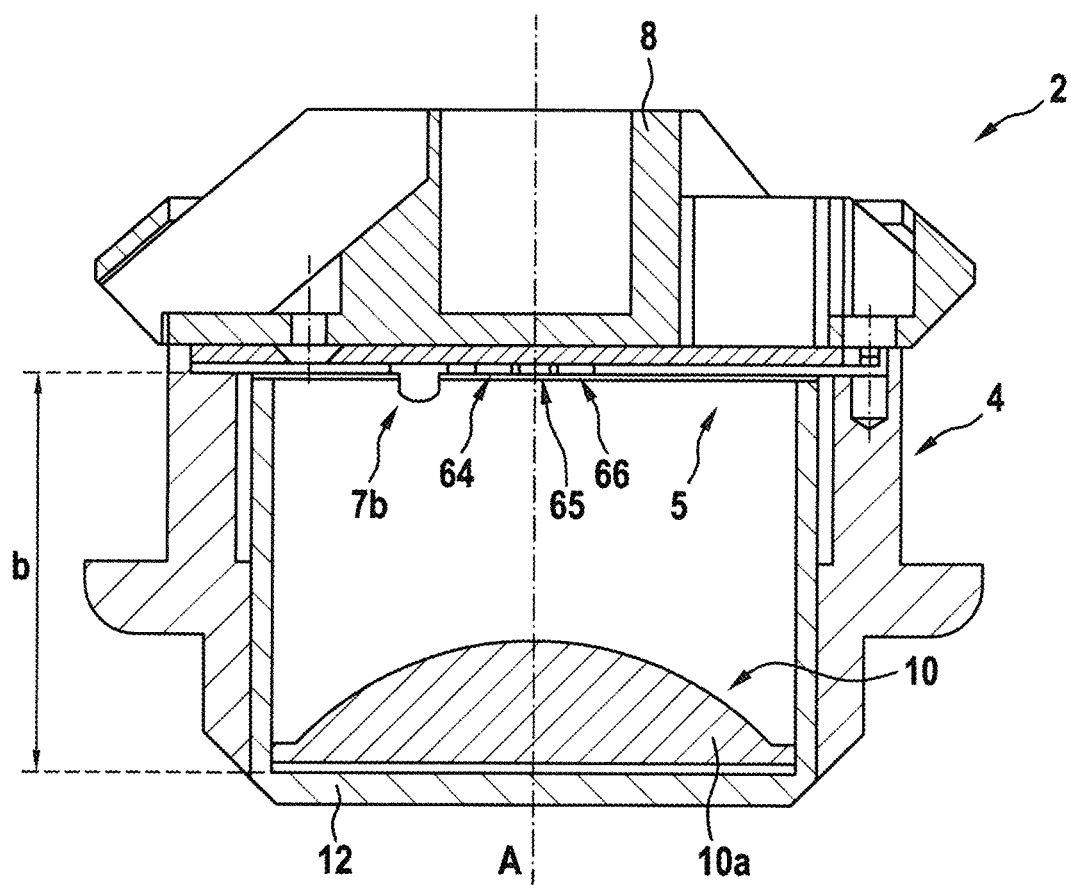
FIG. 4 shows another cross-sectional view of the aircraft passenger reading light shown in FIG. 3A.

FIGS. 3A and 4 depict cross-sectional views of an exemplary embodiment of an aircraft passenger reading light 2, as it may be installed in each of the PSUs 120.

In the illustration depicted in FIG. 3A, the cross-sectional plane is oriented basically horizontally, i.e. basically parallel to the floor 110 of the passenger cabin 102, when the aircraft passenger reading light 2 is installed within the passenger cabin 102 above the passenger seats 80a-80c, as it is depicted in FIGS. 2A and 2B.

In the illustration depicted in FIG. 4, the cross-sectional plane is oriented vertically, i.e. orthogonally to the cross-sectional plane of FIG. 3A.

The aircraft passenger reading light 2 has a substantially cylindrical housing 4 (see FIG. 4), extending with a diameter D of, for example, 40 mm (1.5748 inch) to 50 mm (1.9685 inch), in particular a diameter D of 45 mm (1.7717 inch), around a central axis A. When the aircraft passenger reading light 2 is installed within the passenger cabin 102, the central axis A is oriented basically vertically, i.e. orthogonally to the floor 110 of the passenger cabin 102.

A planar circuit board 5, in particular a printed circuit board (PCB) 5, is arranged within the housing 4. The circuit board 5 is basically circular, with three (optional) recesses 3 being formed within the outer periphery of the circuit board 5. The circuit board 5 extends basically orthogonally to the central axis A and supports a plurality of light sources 61-69, 7a, 7b, 7c. When the aircraft passenger reading light 2 is installed within the passenger cabin 102 above the passenger seats 80a-80c, the plurality of light sources 61-69, 7a, 7b, 7c face the passenger seats 80a-80c.

In the embodiment depicted in FIGS. 3A and 4, the aircraft passenger reading light 2 comprises twelve light sources 61-69, 7a, 7b, 7c arranged in a rectangular matrix configuration.

The aircraft passenger reading light 2 in particular comprises nine reading light sources 61-69, which are arranged in three rows 6d, 6e, 6f and three columns 6a, 6b, 6c.

The distance d1 between adjacent rows 6d, 6e, 6f of reading light sources 61-69 may be in the range of 2 mm (0.0787 inch) to 5 mm (0.1969 inch), it in particular may be 3 mm (0.1181 inch); and the distance d2 between adjacent columns 6a, 6b, 6c of reading light sources 61-69 may be in the range from 9 mm (0.3543 inch) to 15 mm (0.5906 inch), it in particular may be 11 mm (0.4331 inch).

Each of the columns 6a, 6b, 6c is associated with one of the passenger seats 80a-80c in a seating row 80, respectively. I.e. in the exemplary configuration depicted in FIG. 3A, the reading light sources 61, 62, 63 in the first column 6a are configured for providing reading illumination 60c for the third (window) seat 80c, the reading light sources 64, 65, 66 in the second column 6b are configured for providing reading illumination 60b for the second (middle) seat 80b, and the reading light sources 67, 68, 69 in the third column 6c are configured for providing reading illumination 60a for the first (aisle) seat 80a (cf. FIG. 2B).

The reading light, emitted by the aircraft passenger reading light 2, may be adjusted in the longitudinal direction L of the passenger cabin 102 by selectively activating one of the plurality of rows 6d, 6e, 6f of reading light sources 61-69.

For example, each of the rows 6d, 6e, 6f of reading light sources 61-69 may be associated with a different distance, measured in the longitudinal direction L, between the aircraft passenger reading light 2 and the corresponding seating row 80, corresponding to a different distance a between adjacent rows 80 of passengers seats 80a-80c within the aircraft passenger cabin 102.

Providing a plurality of rows 6d, 6e, 6f of reading light sources 61-69 may allow for using the same aircraft passenger reading light 2 in combination with different passenger seat arrangements within the aircraft passenger cabin 102. It in particular allows for using the same aircraft passenger reading light 2 in combination with passenger seat arrangements having different distances a between adjacent rows 80 of passenger seats 80a-80c in the longitudinal direction L (cf FIG. 2).

An aircraft passenger reading light 2 comprising different rows 6d, 6e, 6f of reading light sources 61-69 may further allow for using the same type of aircraft passenger reading light 2 in cases where the mounting position of the PSU 120 is constrained in the longitudinal direction L of the aircraft 100 to somewhat in front of and/or somewhat behind the seating row 80, so that the aircraft passenger reading light 2 is not arranged directly over the associated seating row 80.

An aircraft passenger reading light 2, comprising different rows 6d, 6e, 6f, of reading light sources 61-69 may also allow for leaving the aircraft passenger reading light 2 in the same position, when the seating rows 80 are re-arranged at some point during the life cycle of the aircraft 100. This keeps the re-configuration efforts low.

The aircraft passenger reading light 2 further comprises three infrared light sources 7a, 7b, 7c. Each infrared light source 7a, 7b, 7c is associated with one of the columns 6a, 6b, 6c of reading light sources 61-69, respectively. In the embodiment depicted in FIG. 3A, each of the infrared light sources 7a, 7b, 7c is arranged in a position located on a linear extension of the respective column 6a, 6b, 6c of reading light sources 61-69. The infrared light sources 7a, 7b, 7c are located in a distance d0 of 3 mm (0.1181 mm) to 8 mm (0.3150 inch), in particular at a distance of 5 mm (0.1969 inch) from the uppermost row 6d of reading light sources 61-69.

Figure 3B:
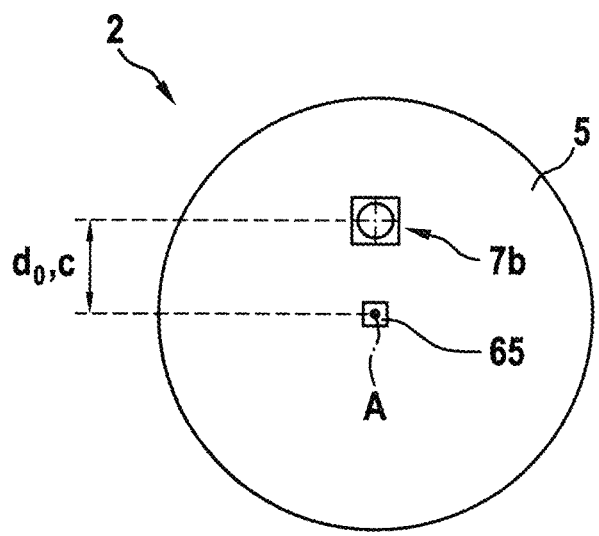
FIG. 3B shows a cross-sectional view of a minimum configuration of an aircraft passenger reading light according to another exemplary embodiment of the invention.

It is to be noted that a configuration comprising a plurality of reading light sources 61-69 and/or a plurality of infrared light sources 7a, 7b, 7c, as it is depicted in FIG. 3A, is optional. In a minimum configuration, as it is depicted in FIG. 3B, an aircraft passenger reading light 2 according to an exemplary embodiment of the invention may comprise only a single reading light source 65 and a single infrared light source 7b, respectively.

In another exemplary embodiment, an aircraft passenger reading light 2 may comprise only a single column 6a, 6b, 6c of reading light sources 61-69 in combination with a single infrared light source 7a, 7b, 7c. In yet another embodiment, an aircraft passenger reading light 2 may comprise a single row 6d, 6e, 6f of reading light sources 61-69, with an infrared light source 7a, 7b, 7c being associated with each of the reading light sources 61-69, respectively.

Referring to the cross-sectional view depicted in FIG. 4, a heat sink 8, which is configured for dissipating the heat generated by operating the reading light sources 61-69, is mounted to the circuit board 5. The heat sink 8 is in particular attached to a rear side of the circuit board 5, i.e. to the side opposite to the reading light sources 61-69.

An optical system 10, including at least one optical lens 10a, is arranged within the path of light emitted by the light sources 61-69, 7a, 7b, 7c. Although not shown in the figures, the optical system 10 may also comprise at least one reflector and/or at least one shutter in addition or alternatively to the depicted lens 10a.

The common optical element 10 includes a lens 10a, which is arranged in a distance b of 20 mm (0.7874 inch) to 40 mm (1.5748 inch), in particular at a distance b of 25 mm (0.9843 inch) to 35 mm (1.3780 inch), more particularly at a distance b of approximately 30 mm (1.1811 inch), from the light sources 61-69, 7a, 7b, 7c.

A transparent cover 12 closes the housing 4, but allows the light emitted by the light sources 61-69, 7a, 7b, 7c to pass through and exit the housing 4.

The optical system 10 is configured for forming the distribution of light emitted by the light sources 61-69, 7a, 7b, 7c into light beams 9, 11, in particular into a reading light beam 9 and into an infrared light beam 11, and for directing the respective light beams 9, 11 into dedicated areas located on and/or in the vicinity of a passenger seat 80a associated with the respective aircraft passenger reading light 2.

Figure 5A:
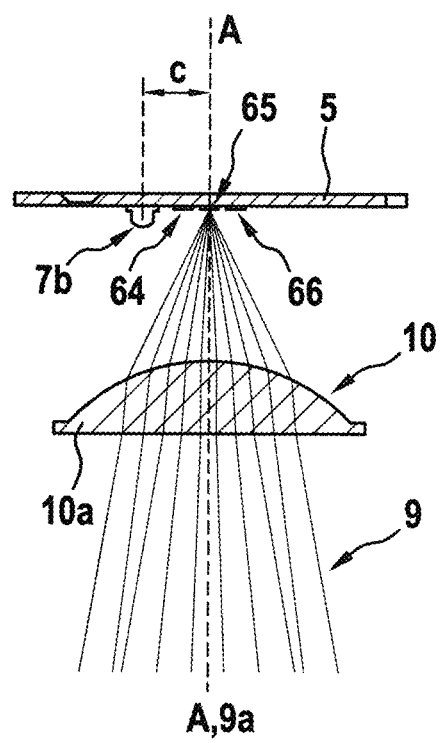
FIG. 5A illustrates the formation of a reading light beam, generated by an aircraft passenger reading light according to an exemplary embodiment of the invention.
Figure 6:
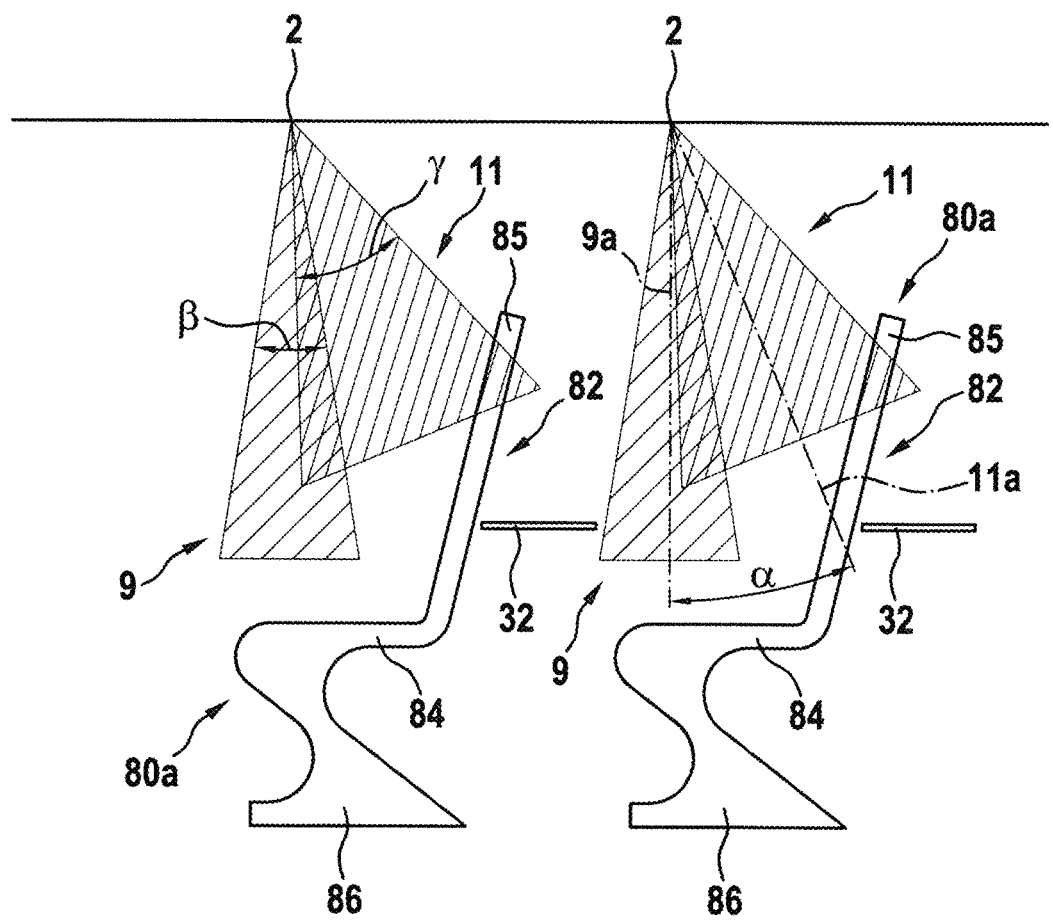
FIG. 6 schematically shows light regions of visible light and infrared light, emitted by aircraft passenger reading lights according to an exemplary embodiment of the invention.
Figure 7A:
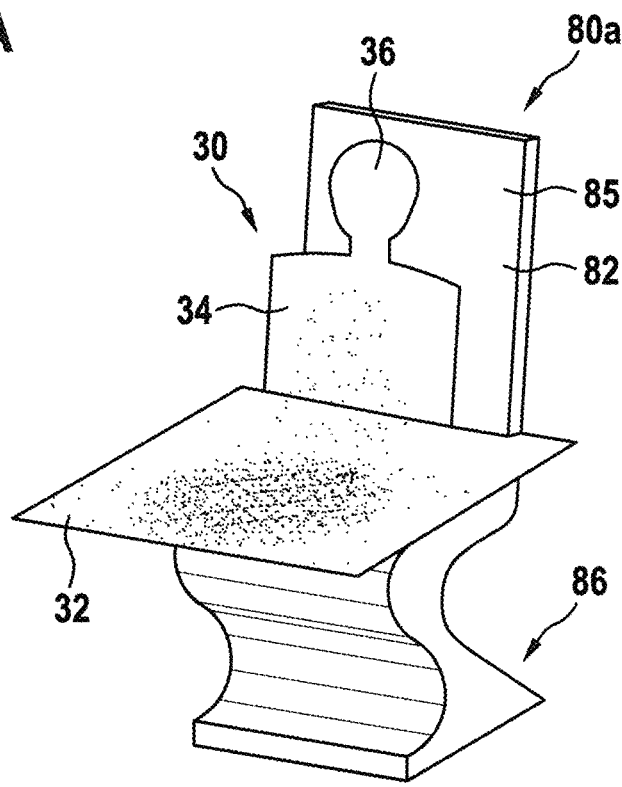
FIG. 7A illustrates an illumination pattern of visible light, generated by an aircraft passenger reading light according to an exemplary embodiment of the invention.

FIGS. 5A and 6 schematically illustrate a reading light beam 9 formed from the visible light emitted by one of the reading light sources 61-69. FIG. 7A schematically illustrates the light pattern formed by such a reading light beam 9 on a table 32 arranged in front of a passenger 30 sitting on a passenger seat 80a.

The reading light beam 9 is configured for illuminating a region located in front of and/or above a front portion of a passenger 30 sitting in the associated passenger seat 80, in particular for illuminating a lap portion 31 of the passenger 30 or a table 32 arranged above the lap of the passenger 30, as it its depicted in FIG. 7A.

As mentioned before, in an embodiment comprising a matrix configuration of light sources 61-69, 7a, 7b, 7c, as it is shown in FIG. 3A, the position of the area illuminated by the reading light beam 9 may be shifted in the longitudinal direction L of the passenger cabin 102 by selectively activating a reading light source 61-69 in one of the three rows 6d, 6e, 6f of reading light sources 61-69.

Figure 5B:
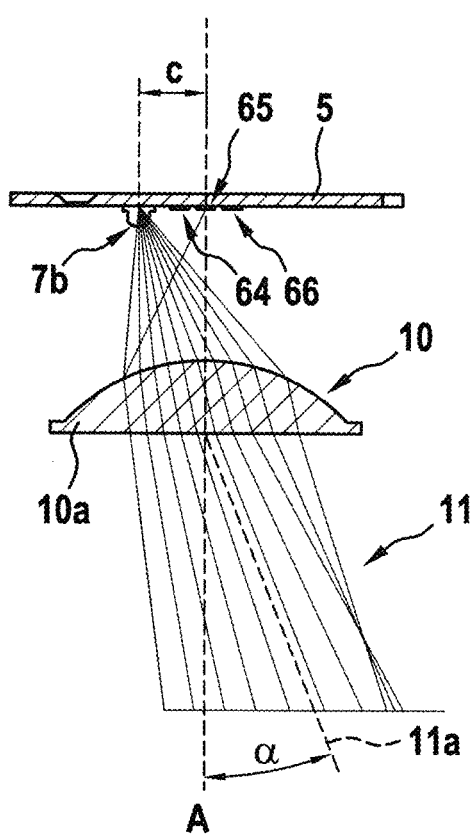
FIG. 5B illustrates the formation of an infrared light beam, generated by an aircraft passenger reading light according to an exemplary embodiment of the invention.
Figure 7B:
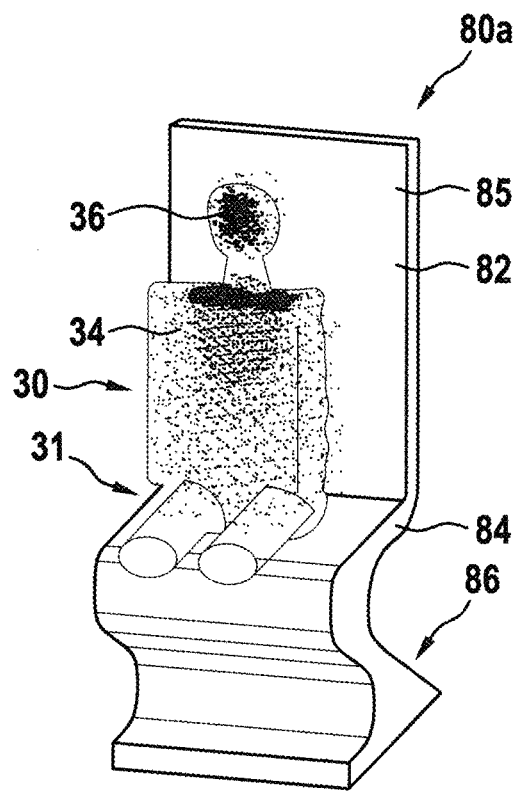
FIG. 7B illustrates an illumination pattern of infrared light, generated by an aircraft passenger reading light according to an exemplary embodiment of the invention.

FIGS. 5B and 6 schematically illustrate an infrared light beam 11 formed from the infrared light emitted by the infrared light source 7a associated with the respective passenger seat 80a. FIG. 7B schematically illustrates the light pattern formed by such an infrared light beam 11 on a passenger 30, in particular on an upper body portion 34 and the face 36 of the passenger 30, sitting on the passenger seat 80a.

As the infrared light source 7a is arranged in a larger horizontal distance c from the central axis A of the aircraft passenger reading light 2 than the reading light sources 61-69 (see FIGS. 5A and 5B), the light emitted by the infrared light source 7a impinges on the lens 10a of optical system 10 (FIG. 5B) in a different angle than the visible light emitted by the reading light sources 61-69 (FIG. 5A). In consequence, the infrared light beam 11 formed from the infrared light emitted by the infrared light source 7a leaves the aircraft passenger reading light 2 in a different direction than the reading light beam 9.

In the exemplary embodiment of an aircraft passenger reading light 2, shown in FIGS. 5A and 5B, the reading light beam 9, depicted in FIG. 5A, is directed basically in line with the central axis A of the aircraft passenger reading light 2, whereas the infrared light beam 11, depicted in FIG. 5B, is inclined with respect to the central axis A of the aircraft passenger reading light 2 by an angle α, with 0°<α<90°.

The infrared light beam 11 in particular is directed towards an upper portion of the backrest 82 of the passenger seat 80a, more particularly towards a headrest 85 of the passenger seat 80, for illuminating an upper body portion 34, in particular the face 36, of a passenger 30 sitting on the passenger seat 80a (see FIG. 7B).

The angle α between the direction 9a of the reading light beam 9 and the direction 11a of the infrared light beam 11 may be in the range of 20° to 30°, in particular in the range of 24° to 26°.

The opening angles β,γ of the light beams 9, 11 (see FIG. 6) may be in the range of 15° to 30°, in particular close to 25°, respectively.

In order to achieve en effective illumination of the upper portion of the passenger's body 30 by the infrared light beam 11 without glaring adjacent passengers 30 with visible light, it may be desirable that the opening angle γ of the infrared light beam 11 is larger than the opening angle β of the reading light beam 9 (γ>β).

As the opening angle β, γ of a light beam 9, 11 increases when the light emitting area of the light source 61-69, 7a, 7b, 7c, emitting the light forming the respective light beam 9, 11 is increased, the opening angle γ of the infrared light beam 11 may be made larger than the opening angle β of the reading light beam 9 by employing infrared light sources 7a, 7b, 7c with a light emitting surface which is larger than the light emitting surfaces of the reading light sources 61-69.

In order to allow the at least one surveillance camera 90 (cf. FIG. 2A) to take and provide pictures of the passengers 30 with high quality, the infrared light sources 7a, 7b, 7c may for example be configured for illuminating the upper portion of the passenger's body 30, in particular the passenger's face 36, with an irradiance level in the range of 50 to 500 mW/m2, in particular with an irradiance level in the range of 150 to 350 mW/m2, and more particularly with an irradiance level in the range of 120 to 300 mW/m2.

Illuminating a passenger 30 with infrared light, provided by a dedicated infrared light source 7a, 7b, 7c, is generally not necessary when the passenger 30 is sufficiently illuminated by visible light, such as ambient light, general cabin light, etc. In order to avoid overexposure, it may be desirable to automatically deactivate the infrared light source 7a, 7b, 7c, associated with a respective passenger 30, when the passenger 30 associated with said infrared light source 7a, 7b, 7c is sufficiently illuminated by ambient light, general cabin light, etc.

For automatically activating and deactivating the infrared light sources 7a, 7b, 7c as a function of visible light illuminating the respective passenger 30, a photodetector 15 may be associated with each of the infrared light sources 7a, 7b, 7c.

The aircraft passenger reading light 2 further may comprise a controller 17, which is configured for controlling the infrared light sources 7a, 7b, 7c as a function of the amount of visible light detected by the photodetector 15, associated with the respective infrared light source 7a, 7b, 7c.

In an embodiment, the controller 17 is configured for activating the at least one infrared light source 7a, 7b, 7c, when the visible light detected by the associated photodetector 15 is below a predetermined activation threshold, and/or the controller 17 is configured for deactivating the at least one infrared light source 7a, 7b, 7c, when the visible light detected by the associated photodetector 15 exceeds a predetermined deactivation threshold.

The activation threshold and the deactivation threshold may be the same or they may differ constituting a hysteresis in order to avoid that the infrared light source 7a, 7b, 7c is oscillatingly switched on and off, when the detected amount of visible light is close to, i.e. slightly above or below, the predetermined threshold.

In another embodiment, the controller 17 is configured for gradually increasing the intensity of infrared light emitted by the associated infrared light source 7a, 7b, 7c, when the intensity of visible light detected by the photodetector 15 decreases, and for gradually decreasing the intensity of infrared light emitted by the associated infrared light source 7a, 7b, 7c, when the intensity of visible light detected by the photodetector 15 increases. The controller 17 may be configured for increasing and/or decreasing the intensity of infrared light emitted by the at least one infrared light source 7a, 7b, 7c step by step or continuously.

Figure 8:
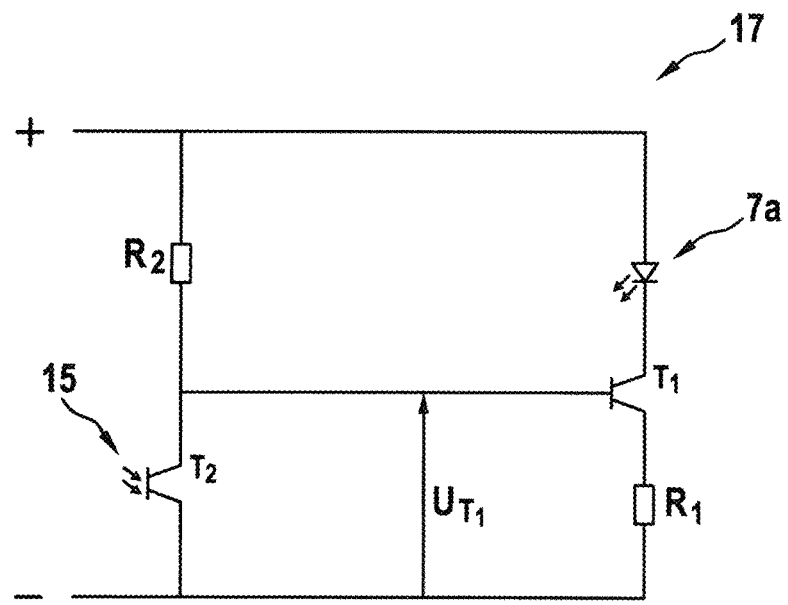
FIG. 8 is a circuit diagram of a controller of an aircraft passenger reading light according to an exemplary embodiment of the invention.

A circuit diagram of an exemplary implementation of a controller 17, which is configured for continuously controlling the intensity of infrared light emitted by an infrared light source 7a is depicted in FIG. 8. The controller 17 comprises two transistors T1, T2 and two resistors R1, R2. The second transistor T2 is a photosensitive transistor, which is sensitive to visible light and acts as a photodetector 15.

When the visible light detected by the second transistor T2/photodetector 15 increases, the resistance of said second transistor T2 decreases. This reduces the voltage UT1 at the base of the first transistor T1 causing less electric current to flow through the first transistor T1 and the infrared light source 7a, thereby reducing the amount of infrared light emitted by the infrared light source 7a.

On the other hand, when the light detected by the second transistor T2/photodetector 15 decreases, the resistance of said second transistor T2 increases. This raises the voltage UT1 at the base of the first transistor T1 causing more electric current to flow through the first transistor T1 and the infrared light source 7a, which increases the amount of infrared light emitted by the infrared light source 7a.

Figure 9:
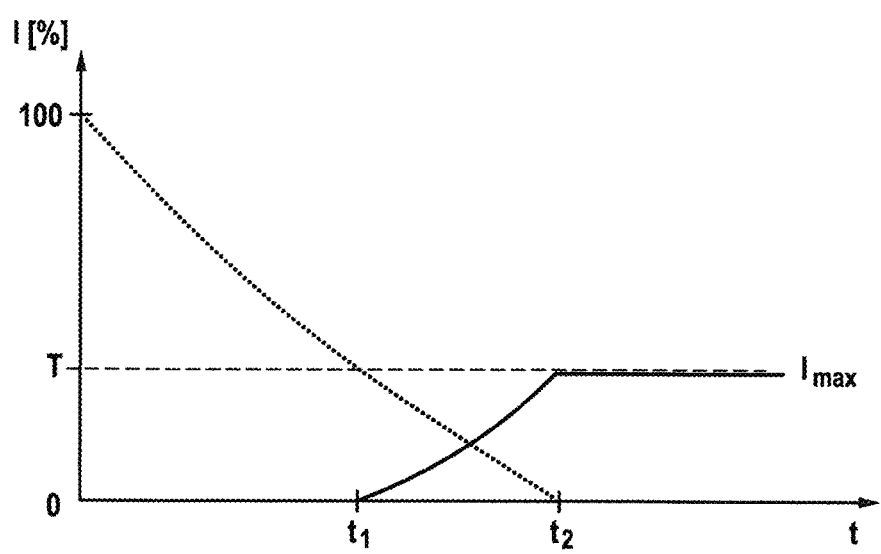
FIG. 9 is a diagram illustrating a gradual adjustment of the intensity of infrared light, emitted by an aircraft passenger reading light according to an exemplary embodiment of the invention, as a function of detected visible light.

FIG. 9 shows a diagram schematically illustrating an example of gradually controlling the operation of an infrared light source 7a, 7b, 7c as a function of detected visible light.

The diagram depicts the intensity I of visible light detected by the photodetector 15 (dotted line) and the intensity I of infrared light emitted by an infrared light source 7a, 7b, 7c (solid line) on the vertical axis over the time t, which is denoted on the horizontal axis.

When the intensity I of visible light detected by the photodetector 15 exceeds a predefined threshold T (0<t<t1), the visible light is deemed to sufficiently illuminate the passenger 30. Thus, the associated infrared light source 7a, 7b, 7c is switched off.

When the intensity I of visible light detected by the photodetector 15 drops below the predefined threshold T (t=t1), the visible light is not deemed to sufficiently illuminate passenger 30. In consequence, the corresponding infrared light source 7a, 7b, 7c is activated, and the intensity I of infrared light emitted by the corresponding infrared light source 7a, 7b, 7c is increased, when the intensity I of visible light detected by the photodetector 15 further decreases (t1<t<t2).

At t=t2, the intensity I of visible light detected by the photodetector 15 has dropped to zero. In consequence, the infrared light source 7a, 7b, 7c is operated at its maximum intensity Imax, which, in this exemplary case, is identical with the predefined threshold T.

In the diagram depicted in FIG. 9, the maximum intensity Imax of the infrared light source 7a, 7b, 7c coincides with the predefined threshold T. Generally, the maximum intensity Imax of the infrared light source 7a, 7b, 7c may differ from the predefined threshold T.

Although the time t is denoted on the horizontal axis in FIG. 9, the controlling of the infrared light source 7a, 7b, 7c does not need to change over time. In other words, the diagram depicted in FIG. 9 may be also be understood as assigning an intensity I of infrared light, emitted by one of the infrared light sources 7a, 7b, 7c, to each intensity I of visible light detected by the photodetector 15.

When the intensity I of visible light detected by the photodetector 15 remains constant over time t, the intensity I of infrared light, emitted by the respective infrared light source 7a, 7b, 7c, will remain constant over time t as well.

When the intensity I of visible light detected by the photodetector 15 changes to a new value, the intensity I of infrared light, emitted by the respective infrared light source 7a, 7b, 7c, changes to a new value, which is associated with the newly detected amount of visible light.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An aircraft passenger reading light, comprising:
    at least one reading light source, which is arranged for emitting visible light in a reading light emission direction for illuminating a passenger reading space with visible light;
    at least one infrared light source, which is arranged for emitting infrared light in an infrared light emission direction for illuminating a passenger sitting space with infrared light; and
    at least one common optical element;
    wherein the infrared light emission direction is inclined with respect to the reading light emission direction, and
    wherein visible light emitted by the at least one reading light source and infrared light emitted by the at least one infrared light source are directed into the reading light direction and the infrared light direction, respectively, by the at least one common optical element.

2. The aircraft passenger reading light according to claim 1, wherein the infrared light emission direction is inclined with respect to the reading light emission direction at an angle ($\alpha$) between 5° and 30°.

3. The aircraft passenger reading light according to claim 2, wherein the angle ($\alpha$) is between 10° and 20°.

4. The aircraft passenger reading light according to claim 1, further comprising:
    wherein the at least one common optical element includes at least one lens, in particular a lens which is arranged in a distance (b) of 20 mm to 40 mm from the light sources, at least one reflector, or a combination thereof.

5. The aircraft passenger reading light according to claim 1, wherein the at least one common optical element is configured for forming a reading light beam from the visible light emitted by the at least one reading light source and an infrared light beam from the infrared light emitted by the at least one infrared light source, wherein the visible light beam or the infrared light beam have an opening angle of between 20° and 30°.

6. The aircraft passenger reading light according to claim 1, wherein the at least one reading light source and the at least one infrared light source are mounted to a common support member, in particular to a common printed circuit board.

7. The aircraft passenger reading light according to claim 1, wherein the at least one reading light source and the at least one infrared light source are spaced apart from each other at a distance ($d_0$), which is in the range of 3 mm to 8 mm, in particular at a distance of 5 mm.

8. The aircraft passenger reading light according claim 1, comprising a plurality of reading light sources and a plurality of infrared light sources,
    wherein each of the plurality of reading light sources is associated with a respective infrared light source.

9. The aircraft passenger reading light according claim 1, comprising a plurality of reading light sources and a plurality of infrared light sources,
    wherein the plurality of reading light sources are arranged in multiple groups of reading light sources, and wherein each of the multiple groups of reading light sources is associated with a respective infrared light source.

10. The aircraft passenger reading light according claim 1, comprising:
    a plurality of light sources arranged in a matrix configuration having a plurality of rows and columns, wherein at least one infrared light source and a plurality of reading light sources are arranged in each of the columns, respectively.

11. The aircraft passenger reading light according to claim 1, further comprising:
    a photodetector configured for detecting visible light; and
    a controller configured for controlling the operation of the at least one infrared light source as a function of the visible light detected by the photodetector.

12. The aircraft passenger reading light according to claim 11, wherein the controller is configured for activating the at least one infrared light source when the visible light detected by the photodetector is below a predetermined activation threshold (T), and/or wherein the controller is configured for deactivating the at least one infrared light source when the visible light detected by the photodetector exceeds a predetermined deactivation threshold (T).

13. The aircraft passenger reading light according to claim 12, wherein the controller is configured for gradually adjusting the intensity of infrared light emitted by the at least one infrared light source as a function of the intensity of visible light detected by the photodetector,
wherein the controller in particular is configured for increasing the intensity of infrared light emitted by the at least one infrared light sources when the intensity of visible light detected by the photodetector decreases.

14. The aircraft passenger reading light according to claim 12, wherein the controller is configured for gradually adjusting the intensity of infrared light emitted by the at least one infrared light source as a function of the intensity of visible light detected by the photodetector,
wherein the controller in particular is configured for decreasing the intensity of infrared light emitted by the at least one infrared light sources when the intensity of visible light detected by the photodetector increases.

15. An aircraft cabin surveillance system, comprising:
at least one aircraft passenger reading light according to claim 1 and at least one surveillance camera which is sensitive to infrared light.

16. An aircraft passenger cabin, comprising:
an aircraft passenger seat and
an aircraft passenger reading light, comprising:
at least one reading light source, which is arranged for emitting visible light in a reading light emission direction for illuminating a passenger reading space with visible light; and
at least one infrared light source, which is arranged for emitting infrared light in an infrared light emission direction for illuminating a passenger sitting space with infrared light;
wherein the infrared light emission direction is inclined with respect to the reading light emission direction;
wherein the reading light emission direction is directed towards a front portion of the passenger seat and wherein the infrared light emission direction is directed towards a back rest and/or towards a head rest of the passenger seat.

17. An aircraft, comprising an aircraft passenger cabin according to claim 16.

18. The aircraft passenger cabin according to claim 16, wherein the aircraft passenger cabin comprises a table, which is arrangable in a front portion of the passenger seat, and wherein the reading light emission direction of the passenger reading light is directed towards said table, when the table is arranged in a front portion of the passenger seat.

19. A method of illuminating a passenger reading space and of monitoring at least one passenger in an aircraft passenger cabin, wherein the aircraft passenger cabin is equipped with at least one aircraft passenger reading light, with said at least one aircraft passenger reading light comprising at least one reading light source, which is arranged for emitting visible light in a reading light emission direction for illuminating a passenger reading space with visible light, and at least one infrared light source, which is arranged for emitting infrared light in an infrared light emission direction for illuminating a passenger sitting space with infrared light, and at least one common optical element, wherein the infrared light emission direction is inclined with respect to the reading light emission direction and wherein visible light emitted by the a least one reading light source and infrared light emitted by the at least one infrared light source are directed into the reading light direction and the infrared light direction, respectively, by the at least one common optical element,
wherein the method includes:
illuminating the passenger reading space with visible light emitted by the at least one reading light source;
illuminating at least a portion of the at least one passenger with infrared light emitted by the at least one infrared light source; and
taking pictures of the at least one passenger with at least one surveillance camera, which is sensitive to infrared light.

* * * * *